Patented Jan. 8, 1929.

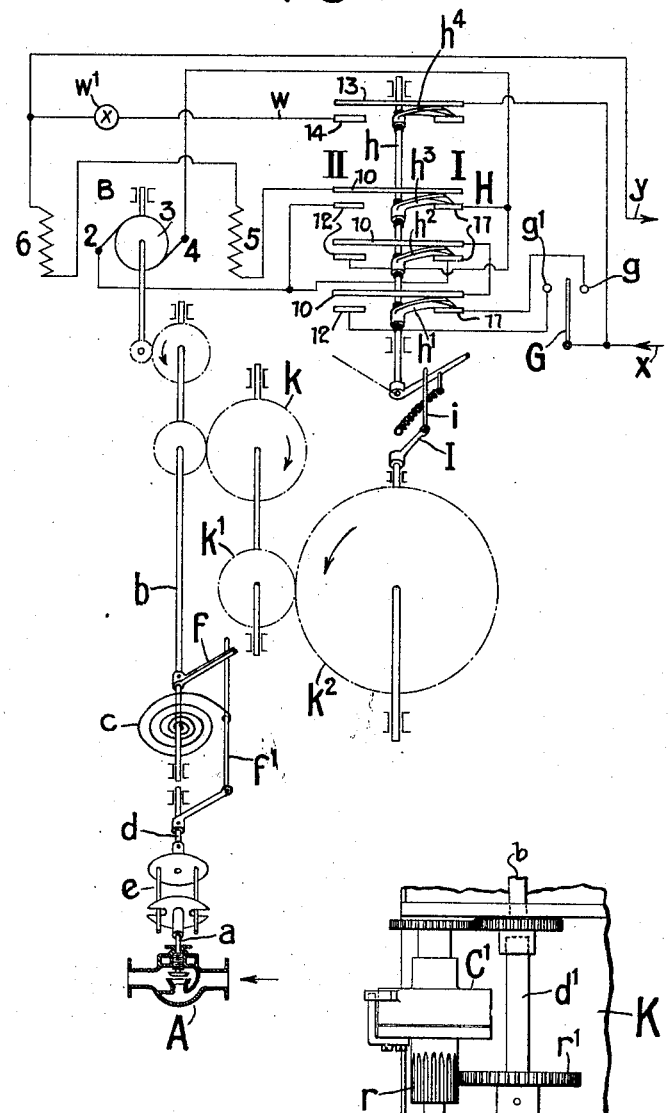

1,698,174

UNITED STATES PATENT OFFICE.

FRITZ SAUTER, OF BASEL, SWITZERLAND.

ELECTRIC REMOTE CONTROL APPARATUS FOR STOP VALVES.

Application filed December 12, 1927, Serial No. 239,597, and in Switzerland December 18, 1926.

This invention relates to electric remote-control apparatus for stop valves having an electric motor adapted to close and open the valve by rotating alternately in one direction or the opposite direction, the motor being for example controlled by hand, by a device dependent upon temperature conditions, by a device dependent upon pressure conditions, or by clockwork dependent upon time. According to the invention the movement of the electric motor, which is connected to a shaft coupled to the stop valve spindle by means of an intermediary spring under tension permitting relative rotation of the shaft with respect to the valve spindle, is also employed for controlling a reversing switch adapted to control the circuit of the motor in such a manner that upon closure of the valve the reversing switch is only actuated so as to break the motor circuit and prepare a circuit for again opening the valve by the reversal of the motor, after the valve has been completely closed. The rotary movement of the motor relative to the valve provides sufficient play to permit the reversing switch to operate in good time, and at any rate not too early, to cut off and reverse the motor in preparation for the return movement.

A preferred constructural form of the invention will now be described with reference to the accompanying drawings in which:

Figure 4 is a diagrammatic view of the stop valve, its associated actuating and controlling mechanism and the circuits for controlling the motor of the actuating mechanism.

Figure 5 is a view of a modification of a portion of the apparatus in detail.

Figure 1:
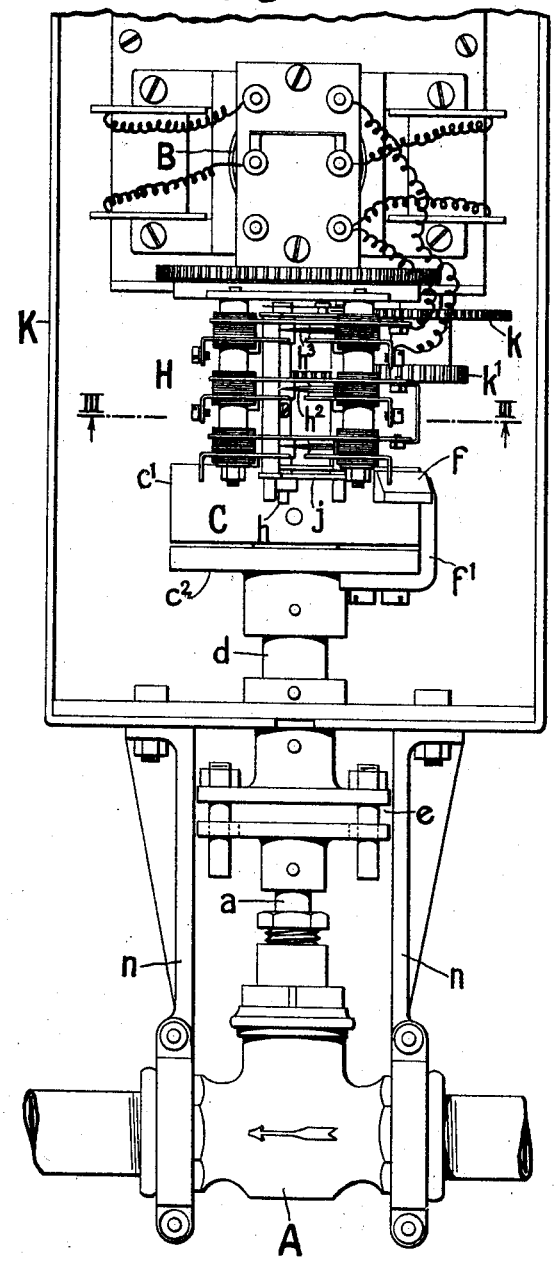
Figure 1 is a diagrammatic front view of the stop valve and its associated actuating and controlling mechanism.
Figure 2:
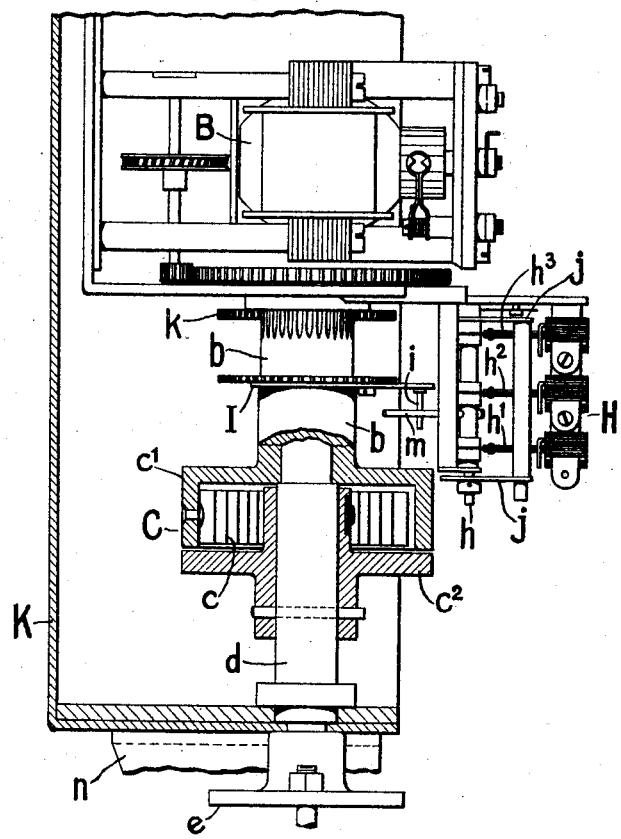
Figure 2 is a partly sectional side view of the actuating and controlling mechanism.

Referring now to the drawings, A is a stop valve mounted in a water conduit and B an electric motor adapted to open and close the valve. The motor B is arranged to rotate, through the intermediary of toothed wheel transmission mechanism illustrated in Figures 1 and 2, a vertical hollow shaft $b$ carrying the body or drum $c^1$ of a spiral spring casing C, having a lower portion or lid $c^2$, which is separate from the drum $c^1$ and is secured to a shaft $d$ which is connected by a coupling $e$ with the spindle $a$ of the stop valve A. The coupling $e$, being in the form of a pin coupling of known type permits of longitudinal movement of the valve spindle $a$ with respect to the shaft $d$. The spiral spring $c$ inside the casing C is secured at its inner end to a boss of the casing lid $c^2$ and at its outer end to the cylinder $c^1$ of the casing C (Figure 2). The spiral spring $c$ is continuously under tension and its release is prevented by two co-acting stops $f, f^1$ of which one, $f$ is on the drum $c^1$, and the other, $f^1$ on the lid $c^2$. Upon rotation of the electric motor in such a direction as to close the valve therefore the shaft $d$ is rotated positively but in a resilient manner by means of the spiral spring $c$ under tension and in order to open the valve A the motor is rotated in a direction opposite to the previous direction of rotation.

The circuit arrangements of the electric motor B are illustrated diagrammatically in Figure 4. The circuit of the electric motor is controlled by a control switch G which is arranged to close an electric contact $g$ or $g^1$ in the energizing circuit of the motor B in accordance with alterations in conditions, as for instance, variations in temperature within certain limits, which acting on a metallic rod cause the movement of the switch.

Figure 3:
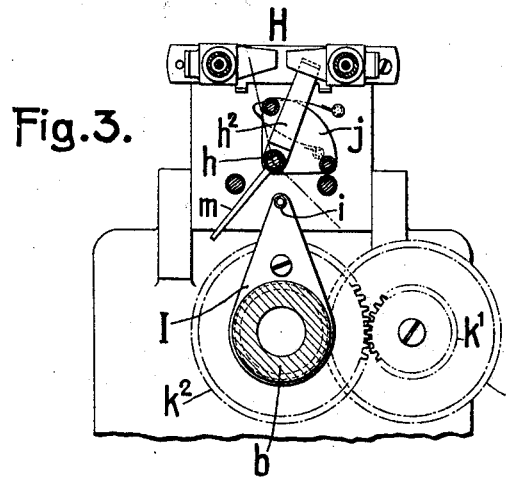
Figure 3 is a view in detail, on the line III—III of Figure 1, of controlling mechanism for the reversing switch.

In order to permit of the reversal of the direction of rotation of the electric motor B, the latter is provided with a three-pole reversing switch H. The reversing switch, as illustrated in the circuit of the motor windings according to Figure 4, is provided with three reversing levers $h^1$, $h^2$, $h^3$ mounted on a common shaft $h$ by means of intermediate insulating bushings, and adapted to be reversed by means of corresponding tumbler switch devices $j$ (Figure 3) mounted on the shaft, thus ensuring instantaneous connection in one or the other contact position. The levers $h^1$, $h^2$, $h^3$ cooperate on the one hand with stationary contact discs 10 through which the shaft $h$ passes freely and which are connected to the motor circuits as shown in Figure 4; on the other hand, they can each be brought alternately into contact with two corresponding contact fingers 11, 12 aligned the one, 11, according to position I and the other, 12, according to position II of the reversing switch. The reversal of the switch H is effected by means of a controlling arm I loosely mounted on the shaft $b$ (Figure 3) and provided with a reversing pin $i$, rotary movement being transmitted to the arm I through toothed wheel transmission mechanism $k, k^1, k^2$, as illustrated in Figure 4 in which for the sake of clearness, the controlling arm I is illustrated as being at one side of the shaft $b$. The toothed wheel transmission mechanism $k, k^1, k^2$ is in such relation with the rotational movement of the electric motor for the movement of the stop valve, that only after complete closure of the stop valve will the controlling arm I by means of its pin $i$, effect the reversal of the levers of the reversing switch. Reversal is effected by the pin $i$ of the controlling arm I towards the end of its movement abutting against an arm $m$ secured to the tumbler switch shaft $h$, and thereby moving the tumbler switches $j$ over their dead centre positions, so that they then reverse the switch levers of the reversing switch from one contact position to the other very rapidly.

The method of operation of the remote-control apparatus for the stop valve is as follows:

In Figure 4 the valve is shown in the open position but as soon as the contact arm of the control switch G touches the contact $g$, current flows from the supply terminal $x$ through the reversing switch levers $h^1, h^2$ to the terminal 2 of the motor armature 3, through the armature to the terminal 4, through the switch lever $h^3$, and through the field windings 5, 6 of the motor to the supply terminal $y$. The motor then rotates the shaft $b$ in the direction indicated by the arrows and by means of the spiral spring $c$ under tension, rotates the shaft $d$.

The valve spindle $a$ is thereby screwed down towards the seat of the valve until the valve disc is firmly seated. The shaft $d$ can then not rotate any further, but the motor driven shaft $b$ however still rotates through a central angle, whereby the stop $f$ is removed from the stop $f^1$ and the spiral spring $c$ is still further tensioned, so that the valve disc is pressed yet more firmly on its seat. Finally the controlling arm I, which by means of the toothed wheel transmission mechanism $k, k^1, k^2$, is about to complete its rotation, effects the reversal of the reversing switch H from the positon I as shown to the position II, in which the motor circuit is interrupted and the electrical circuits for the return movement of the motor completed.

If now by reason of alterations in conditions, the contact arm of the control switch G touches the contacts $g^1$, current will flow from the supply terminal $x$, through the switch $h^1, h^2$ to the terminal 4 of the motor armature 3, through the latter, but now in an opposite direction from the last, to the terminal 2 and switch lever $h^3$, and through the field windings 5, 6 of the motor in the same direction as before, to the supply terminal $y$. The motor is now rotated in the reverse direction, the shaft $b$ being rotated in a direction opposite to the direction of the arrows until the stop $f$ abuts against the stop $f^1$ and upon further rotation of the motor the valve spindle is moved to open the valve. After its rotary movement in the opposite direction the control arm I throws the reversing switch H from its position II back to the position I, whereby the motor circuit is broken and its circuit for the next closing movement of the valve completed.

The reversing switch H, as illustrated in Figure 2 is as a whole removable from the casing K provided for protecting the motor and the controlling mechanism, so that it is easily accessible for inspection, and is provided with an additional switch lever $h^4$ which is mounted on the shaft $h$ by means of an insulating bushing and controls a signalling circuit $w$ (Figure 4) by means of a contact disc 13 and a contact finger 14 contacted or not by said switch lever. In the position of the parts of the reversing switch as illustrated in Figure 4, the signalling circuit $w$ is opened. If the reversing switch G is reversed in the above described manner to illustrated in Figure 4, the signalling circuit $w$ is closed by the switch lever $h^4$ whereby the signal lamp $w^1$ is illuminated.

The spiral spring $c$ plays an important part. Firstly it permits, after closure of the valve, rotation of the motor relatively to the valve, so as to permit even at the commencement of the control movement the reversal of the reversing switch H only after the complete closure of the valve, and in any case not too early, as for instance, when the valve is not completely closed. The tensioned spiral spring $c$ is thus, by the disengagement of the stops $f, f^1$ yet further tensioned, which ensures a tight closure of the valve.

In the modification illustrated in Figure 5 the helical spring casing C is not mounted in alignment with the spindle shaft of the valve, but is at one side thereof, so that by means of transmisison mechanism $r, r^1$ it acts with increased force on the shaft $d^1$ to be connected to the valve spindle, which is to be rotated.

Instead of a spiral spring a helical torsion spring could be employed in both cases.

Attention is called to a constructional detail whereby the valve is suspended by brackets $n$ from the casing K, which protects the motor and the controlling mechanism, the valve being thereby readily removable in view of the constructional form of the coupling $e$.

As an example of the application of the improved remote-control apparatus in practice, a refrigerating installation may for example be mentioned, in which the control switch G is constituted by a thermostatic switch which in accordance with the temperature of the brine has to control the cooling water stop valve of the refrigerating machine, so that the starting and stopping of the refrigerating machine is automatically controlled according to temperature conditions. However this is not the only possible application of the invention and the control switch G may be constructed and aranged to be operated as stated in the opening paragraphs of the specification in any suitable manner according to the particular use to which the apparatus is to be put.

What I claim is:—

1. In an electric remote-control apparatus for stop valves, the combination of an electric motor, a motor shaft connected thereto, a rotary spindle connected to the valve, an interconnecting tensioned spring device between said motor shaft and said valve spindle arranged to allow resilient closure of the valve and positive opening thereof under the control of said motor, an automatic reversing switch for the circuit of said motor and transmission means between the motor shaft and said reversing switch arranged in such a manner that upon closure of the valve the reversing switch is actuated so as to break the operative motor circuit and to prepare same for again opening the valve by reversal of the motor, after the valve has been completely closed.

2. In an electric remote-control apparatus for stop valves, the combination of an electric motor, a motor shaft connected thereto, a rotary spindle connected to the valve and coaxially arranged with said motor shaft, an interconnecting tensioned spiral spring between said motor shaft and said valve spindle arranged to allow resilient closure of the valve and positive opening thereof under the control of said motor, an automatic reversing switch for the circuit of said motor and transmission means between the motor shaft and said reversing switch arranged in such a manner that upon closure of the valve the reversing switch is actuated so as to break the operative motor circuit and to prepare same for again opening the valve by reversal of the motor, after the valve has been completely closed.

3. In an electric remote-control apparatus for stop valves, the combination of an electric motor, a motor shaft connected thereto, a rotary spindle connected to the valve, two arms mounted respectively on said motor shaft and said valve spindle, said arms being in unilateral engagement with one another, an interconnecting tensioned spiral spring between said motor shaft and said valve spindle to cause said engagement, but arranged to allow resilient closure of the valve under the control of said motor, an automatic reversing switch for the circuit of said motor and transmission means between the motor shaft and said reversing switch arranged in such a manner that upon closure of the valve the reversing switch is actuated so as to break the operative motor circuit and to prepare same for again opening the valve by reversal of the motor, after the valve has been completely closed.

4. In an electric remote-control apparatus for stop valves, the combination of an electric motor, a motor shaft connected thereto, a rotary spindle connected to the valve, two arms mounted respectively on said motor shaft and said valve spindle, said arms being in unilateral engagement with one another, an interconnecting tensioned spiral spring between said motor shaft and said valve spindle to cause said engagement, but arranged to allow resilient closure of the valve under the control of said motor, a frame work arranged to carry the whole of said parts, an automatic reversing switch for the circuit of said motor, mounted on a removable frame part, and transmission means between the motor shaft and said reversing switch arranged in such a manner that upon closure of the valve the reversing switch is actuated so as to break the operative motor circuit and to prepare same for again opening the valve by reversal of the motor, after the valve has been completely closed.

5. In an electric remote-control apparatus for stop valves, the combination of an electric motor, a motor shaft connected thereto, a rotary spindle connected to the valve, two arms mounted respectively on said motor shaft and said valve spindle, said arms being in unilateral engagement with one another, an interconnecting tensioned spiral spring between said motor shaft and said valve spindle to cause said engagement, but arranged to allow resilient closure of the valve under the control of said motor, an automatic reversing switch for the circuit of said motor, a signalling circuit, an auxiliary switch for the latter combined with said reversing switch, and transmission means between the motor shaft and said reversing switch arranged in such a manner that upon closure of the valve the reversing switch is actuated so as to break the operative motor circuit and to prepare same for again opening the valve by reversal of the motor, after the valve has been completely closed.

6. In an electric remote-control apparatus for stop valves, the combination of an electric motor, a motor shaft connected thereto, a rotary spindle connected to the valve, two arms mounted respectively on said motor shaft and said valve spindle, said arms being in unilateral engagement with one another, an interconnecting tensioned spiral spring between said motor shaft and said valve spindle to cause said engagement, but arranged to allow resilient closure of the valve under the control of said motor, an automatic reversing switch for the circuit of said motor, having tumbler switch elements, and transmission means between the motor shaft and said reversing switch arranged in such a manner that upon closure of the valve the reversing switch is acutated so as to break the operative motor circuit and to prepare same for again opening the valve by reversal of the motor, after the valve has been completely closed.

In witness whereof I have hereunto signed my name this 25th day of November, 1927.

FRITZ SAUTER.